(12) United States Patent
Moser et al.

(10) Patent No.: US 7,542,639 B2
(45) Date of Patent: Jun. 2, 2009

(54) HOLOGRAPHIC PUMP COUPLER AND LASER GRATING REFLECTOR

(75) Inventors: Christophe Moser, Pasadena, CA (US); Karsten Buse, Bonn (DE); Demetri Psaltis, Pasadena, CA (US)

(73) Assignee: ONDAX, Inc, Monrovia, CA (US)

( * ) Notice: Subject to any disclaimer, the term of this patent is extended or adjusted under 35 U.S.C. 154(b) by 0 days.

(21) Appl. No.: 11/092,392

(22) Filed: Mar. 29, 2005

(65) Prior Publication Data

US 2005/0265656 A1     Dec. 1, 2005

Related U.S. Application Data

(60) Provisional application No. 60/558,331, filed on Mar. 30, 2004.

(51) Int. Cl.
  *G02B 6/34* (2006.01)
  *G02B 5/32* (2006.01)
  *G03H 1/28* (2006.01)

(52) U.S. Cl. .............................. 385/37; 359/15; 359/24

(58) Field of Classification Search .................. 385/37; 359/34, 15, 563, 24
  See application file for complete search history.

(56) References Cited

U.S. PATENT DOCUMENTS

| 5,640,256 | A * | 6/1997 | De Vre et al. .................. 359/3 |
| 6,211,976 | B1 * | 4/2001 | Popovich et al. .............. 359/15 |
| 6,788,849 | B1 * | 9/2004 | Pawluczyk .................... 385/37 |
| 6,879,441 | B1 * | 4/2005 | Mossberg .................... 359/569 |
| 6,904,200 | B2 * | 6/2005 | Wang et al. ................... 385/37 |
| 2002/0045104 | A1 * | 4/2002 | Efimov et al. .................. 430/2 |
| 2002/0141063 | A1 * | 10/2002 | Petrov et al. ................. 359/566 |
| 2002/0181035 | A1 * | 12/2002 | Donoghue .................... 359/10 |
| 2003/0011833 | A1 * | 1/2003 | Yankov et al. ................. 359/34 |
| 2003/0190121 | A1 * | 10/2003 | Luo et al. ...................... 385/37 |
| 2004/0021920 | A1 * | 2/2004 | Psaltis .......................... 359/15 |
| 2004/0165639 | A1 * | 8/2004 | Lang et al. ..................... 372/92 |
| 2004/0253751 | A1 * | 12/2004 | Salnik et al. ................... 438/16 |
| 2004/0258356 | A1 * | 12/2004 | Brice et al. .................... 385/37 |
| 2005/0248820 | A1 * | 11/2005 | Moser et al. ................... 359/15 |
| 2006/0098258 | A1 * | 5/2006 | Chen ........................... 359/15 |

\* cited by examiner

*Primary Examiner*—Michelle R Connelly Cushwa
*Assistant Examiner*—Rhonda S Peace

(57) ABSTRACT

In the present invention, a volume holographic optical element is used as a pump coupler. The holographic coupler allows at least one pump wavelength to be coupled into the laser medium. The direction of the pump beam onto the coupler is not co-linear with the direction of the signal beam out of the coupler. The invention further provides the coupling of more than one pump wavelengths using a single holographic coupler element while maintaining the high isolation between pump and signal beam. The invention further provides a narrow-band reflection grating of various efficiencies for the signal beam (as part of the laser cavity).

22 Claims, 4 Drawing Sheets

HOLOGRAPHIC PUMP COUPLER AND LASER GRATING REFLECTOR

RELATED APPLICATION

The applicant claims priority to provisional patent application No. 60/558,331 filed Mar. 30, 2004.

FIELD OF THE INVENTION

The present invention relates to the field of delivering light to a fiber.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND ART

A prior art-pumped fiber laser consists of a double cladding optical fiber pumped by high power diode lasers and a doped core. The cladding has a numerical aperture ranging, for example, from approximately 0.45 to 0.6. The pump power from a fiber coupled high power diode laser may be coupled to the cladding or fiber core in some instances via a dichroic mirror as FIG. 1 and FIG. 2 illustrate. Pump light is directed by the multimode fiber 100. A dichroic filter 110 is inserted between the multimode pump fiber and the double cladding fiber 140. The dichroic filter 110 is transparent to the pump light 101 and acts as a broad-band reflection filter for the signal beam 120. Alternatively, the dichroic filter 210 reflects the pump beam and is transparent to the signal beam 220. Several publications and patents describe methods to use dichroic filters for end pumping fibers e.g. U.S. Pat. Nos. 5,917,648, 5,966,391 and "Experimental studies on narrow-linewidth Yb3+-doped double-clad fiber-laser cavities based on double-clad fiber Bragg gratings" MICROWAVE AND OPTICAL TECHNOLOGY LETTERS 44 (1): 53-56 Jan. 5, 2005; and "Double-clad fibers enable lasers to handle high power" *Laser Focus World,* January, 1999. Dichroic filters provide both the high reflector (broadband spectrally, several nm) for the signal beam and the isolation between the pump beam and signal beam.

A variation without dichroic filter is to use Fiber Bragg grating in the core of the pumped fiber for the purpose of providing a narrow bandwidth reflection filters (sub nm) at the signal wavelength as described by "Nd-doped double-clad fiber amplifier at 1.06 μm" JOURNAL OF LIGHTWAVE TECHNOLOGY 16 (4): 562-566 April 1998. For multimode doped fiber core, Fiber Bragg gratings do not exist. It is desirable to have a narrow bandwidth spectral output coupler to yield a high spectral brightness laser.

Volume holographic gratings have been shown to be an extremely accurate and temperature-stable means of filtering a narrow passband of light from a broadband spectrum. This technology has been demonstrated in high power density applications (e.g. "Improvement of the spatial beam quality of laser sources with an intracavity Bragg grating", Optics Letters, 28,4, 2003; and "Wavelength Stabilization and spectrum narrowing of high Power multimode laser diodes and arrays by use of Volume Bragg Gratings", Optics Letters, 29, 16, 2004). such as stabilization of high power diode lasers with narrow full-width-at-half-maximum (FWHM) passbands as small as 0.2 nm with several kW/cm$^2$ intensity levels.

Photorefractive materials, such as $LiNbO_3$ crystals and certain types of polymers and glasses, have been shown to be effective media for storing multiple volume holographic gratings such as for optical filters or holographic optical memories with high diffraction efficiency and storage density ("Angle And Space Multiplexed Holographic Storage Using The 90-Degrees Geometry", Opt Commun 117, (1-2),1995; "Cross-Talk For Angle-Multiplexed And Wavelength-Multiplexed Image Plane Holograms" Opt Lett 19 (21), 1994; "Folded shift multiplexing", OPT LETT 28 (11),2003; and "Holographic multiplexing in photorefractive polymers ", OPT COMMUN 185, 2000).

SUMMARY OF THE INVENTION

A volume holographic grating is used to provide the coupling of one or many pump beams of the same or different wavelengths into a fiber and to function as a narrow reflection filter at the signal wavelength emitted by the pumped doped fiber. In one embodiment, a single pump is end-coupled into a fiber by the volume holographic coupler. At the same time, the holographic coupler provides a narrow band spectral reflector for the signal beam. The coupler provides both the coupling mean and one end of the fiber laser resonator. Since the pump and the signal are not co-propagating, the output coupler can be the output of the laser. The narrow band reflector and the coupler are fabricated by multiplexing two gratings in the same volume.

In a second embodiment, multiple pumps (N>1) are end-coupled into a fiber by the volume holographic coupler. At the same time, the holographic coupler provides a narrow band spectral reflector for the signal beam. The coupler provides both the coupling mean and one end of the fiber laser resonator. Since the pump and the signal are not co-propagating, the output coupler can be the output of the laser. The narrow band reflector and the coupler are fabricated by multiplexing N+1 gratings in the same volume.

DETAILED DESCRIPTION OF THE INVENTION

In the following description of the present invention, reference is made to the accompanying drawings which form a part hereof, and in which is shown by way of illustration a specific embodiment in which the invention may be practiced.

It is to be understood that other embodiments may be utilized and structural changes may be made without departing from the scope of the present invention.

The invention is a holographic pump coupler and simultaneously a narrow band grating reflector. The holographic coupler allows at least one pump wavelength to be coupled into the laser medium (such as Fiber laser, but not limited to). The direction of the pump beam onto the coupler is not co-linear with the direction of the signal beam out of the coupler, so that the effective isolation with the pump source is very high (>50 dB). This isolation is enough to shield the pump source from any of the drawbacks mentioned in the prior art. The invention further provides the coupling of more than one pump wavelength, either with relatively large spectral separation, such as 808, 915 and 976 nm or with a relatively narrow spectral separation such as 930 and 940 nm for e.g. using a single holographic coupler element while maintaining the high isolation between pump and signal beam. The invention further provides a narrow-band reflection grating of various efficiencies for the signal beam (as part of the laser cavity). The invention further enables to use high light power since volume holographic elements can be employed that withstand higher optical powers than, e.g., thin film and dielectric filters.

Figure 1:
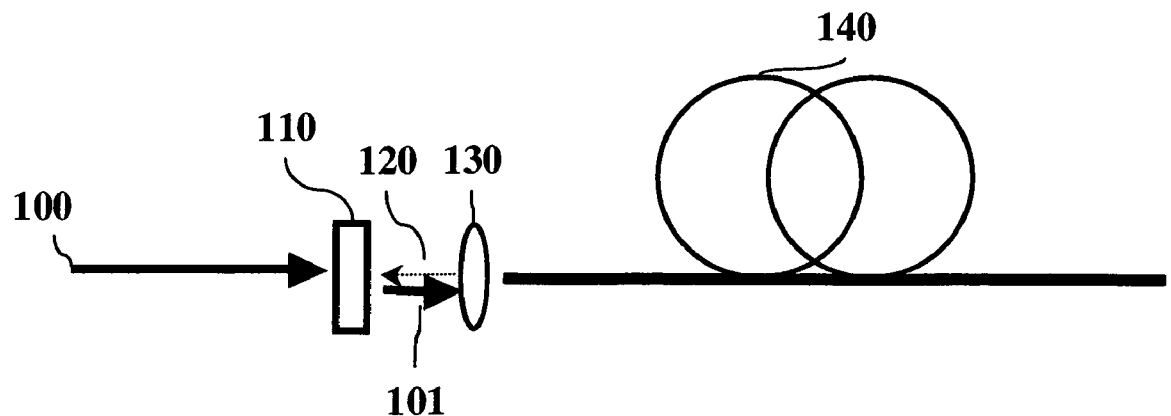
FIG. 1 is a schematic diagram of a prior art means of using a dichroic filter to couple the pump light into a fiber.
Figure 2:
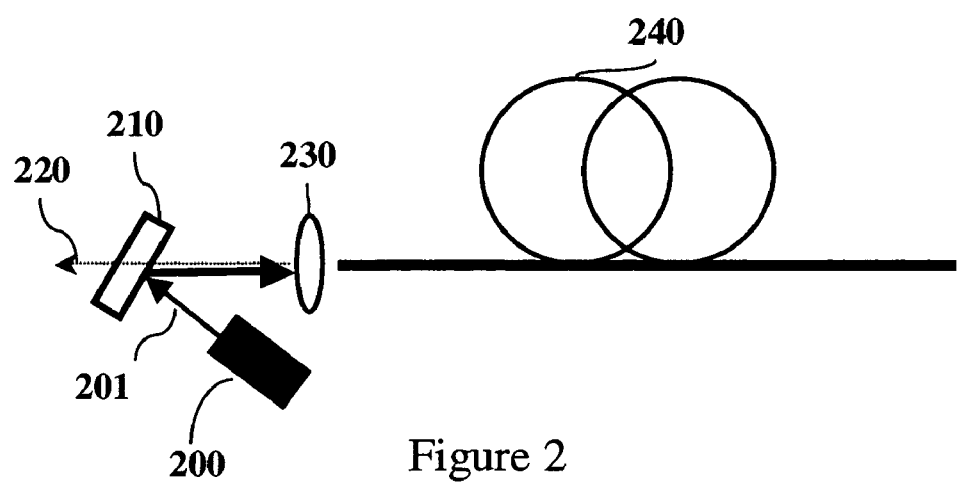
FIG. 2 is a schematic diagram of another prior art means of using a dichroic filter to couple the pump light into a fiber.
Figure 3:
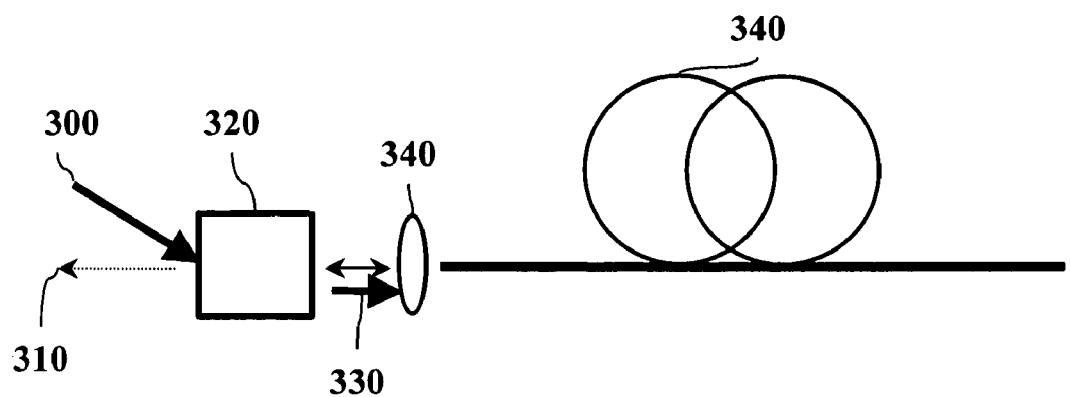
FIG. 3 is a schematic diagram of an embodiment of using a volume holographic grating coupler to couple one pump beam into a fiber.

FIG. 3 illustrates one embodiment of the invention. A holographic coupler 320 is placed before a focusing lens 340. A pump beam 330 is incident on the coupler 320 at an angle with respect to the optical axis. The coupler 320 redirects the pump beam in the direction of the optical axis defined by a lens 340. The pump beam is focused in the fiber by the lens 340 (either directly into the core or into the cladding). The pump beam generates light at higher wavelength (signal beam 310) due to the pumping of ions embedded in the fiber. The signal beam propagates in both directions in the fiber. On one side of the fiber, the coupler 320 contains a volume holographic reflection grating that reflects a narrow band centered around the signal beam wavelength. The efficiency of the grating can vary from a couple of percent to over ninety percent. This grating acts as one end of the fiber laser cavity. On the other end, a similar grating (not shown) can be inserted or a fiber Bragg grating to create the output coupler of the laser cavity. The non-collinear propagation of the signal beam 310 and the pump beam 330 enables very high isolation.

Figure 6:
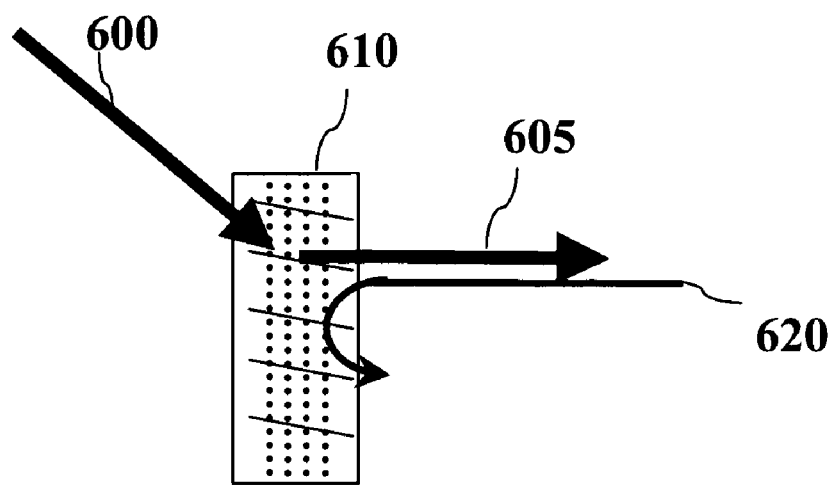
FIG. 6 is an embodiment of a beam arrangement incident on the volume holographic grating coupler to diffract a pump beam and to provide a narrow band reflector for the signal beam.

The operation of the beam can be seen in FIG. 6. Referring to FIG. 6, the pump beam 600 is incident on the VHG coupler at an angle with respect to the diffracted pump beam 605. The pump beam is diffracted by a first grating recorded in the VHG coupler 610. The signal beam 620 is reflected by a second grating multiplexed in the VHG coupler 610. Both the signal and diffracted pump beams propagate in the same direction.

Figure 4:
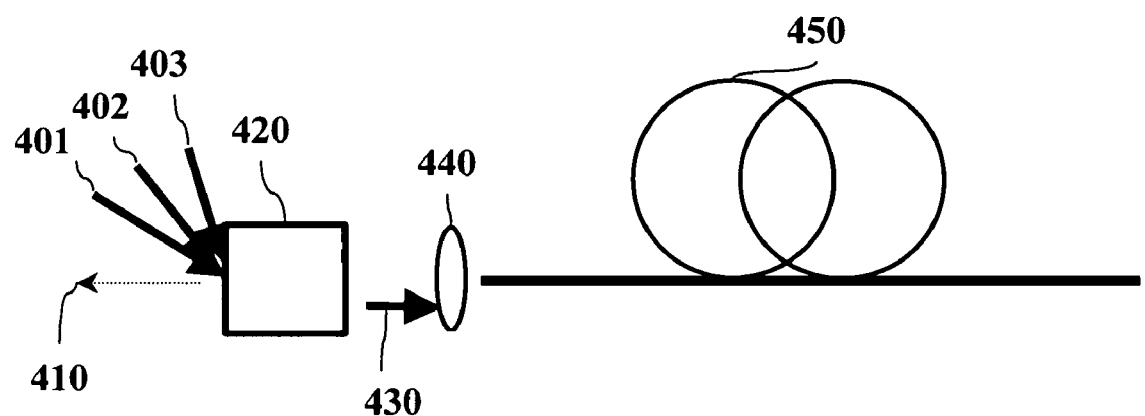
FIG. 4 is a schematic diagram of an embodiment of using a volume holographic grating coupler to couple several pump beam of same or different wavelength into a fiber.

In a second embodiment illustrated by FIG. 4, multiple pump beams (401, 402, 403) are coupled into a fiber by the holographic coupler 420. Each pump beam 401,402, 403 has a different angle of incidence on the holographic coupler. The isolation between signal and pump beam remains very high because of the non-collinear propagation. On one side of the fiber, the coupler 420 contains a volume holographic reflection grating that reflects a narrow band centered around the signal beam wavelength. The efficiency of the grating can vary from a couple of percent to over ninety percent. This grating acts as one end of the fiber laser cavity. On the other end, a similar grating (not shown) or a fiber Bragg grating (not shown) can be inserted to create the output coupler of the laser cavity.

Figure 7:
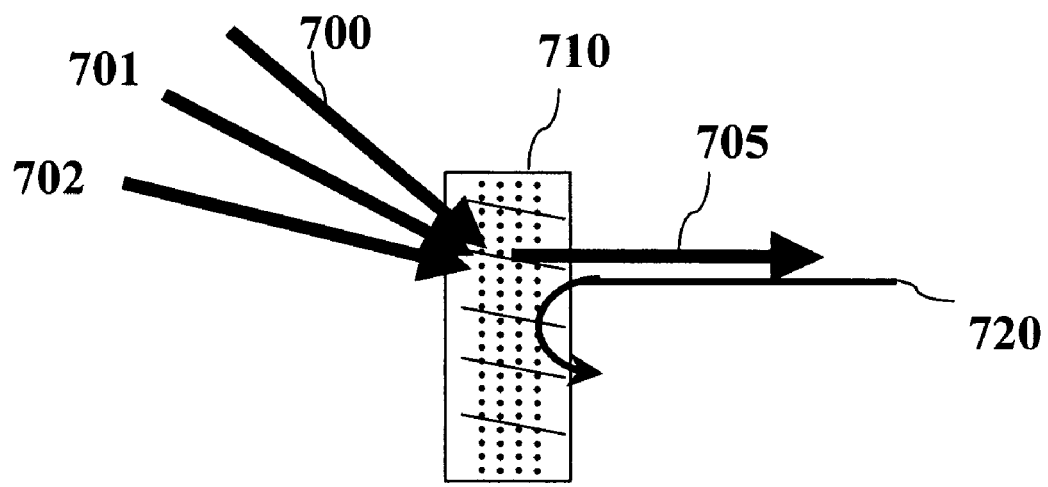
FIG. 7 is an embodiment of a beam arrangement incident on the volume holographic grating coupler to diffract three pump beams of different wavelength and to provide a narrow band reflector for the signal beam.

FIG. 7 illustrates the action of the VHG coupler on the input beams. Referring to FIG. 7, each pump beam 700, 701, 702 is incident on the VHG coupler at a distinct angle with respect to the common direction given by the diffracted pump beam 705. The pump beam 700 is diffracted by a first grating recorded in the VHG coupler 710. The second pump beam 701 is diffracted by a second grating recorded in the VHG coupler 710. The third pump beam 702 is diffracted by a third grating recorded in the VHG coupler 710. The concept is not limited to three pump beams but can be extended to several pump beams. The diffraction direction of all pumps beams co-propagate.

The signal beam 720 is reflected by a second grating multiplexed in the VHG coupler 610. The signal and diffracted pump beams propagate in the same direction.

Figure 5:
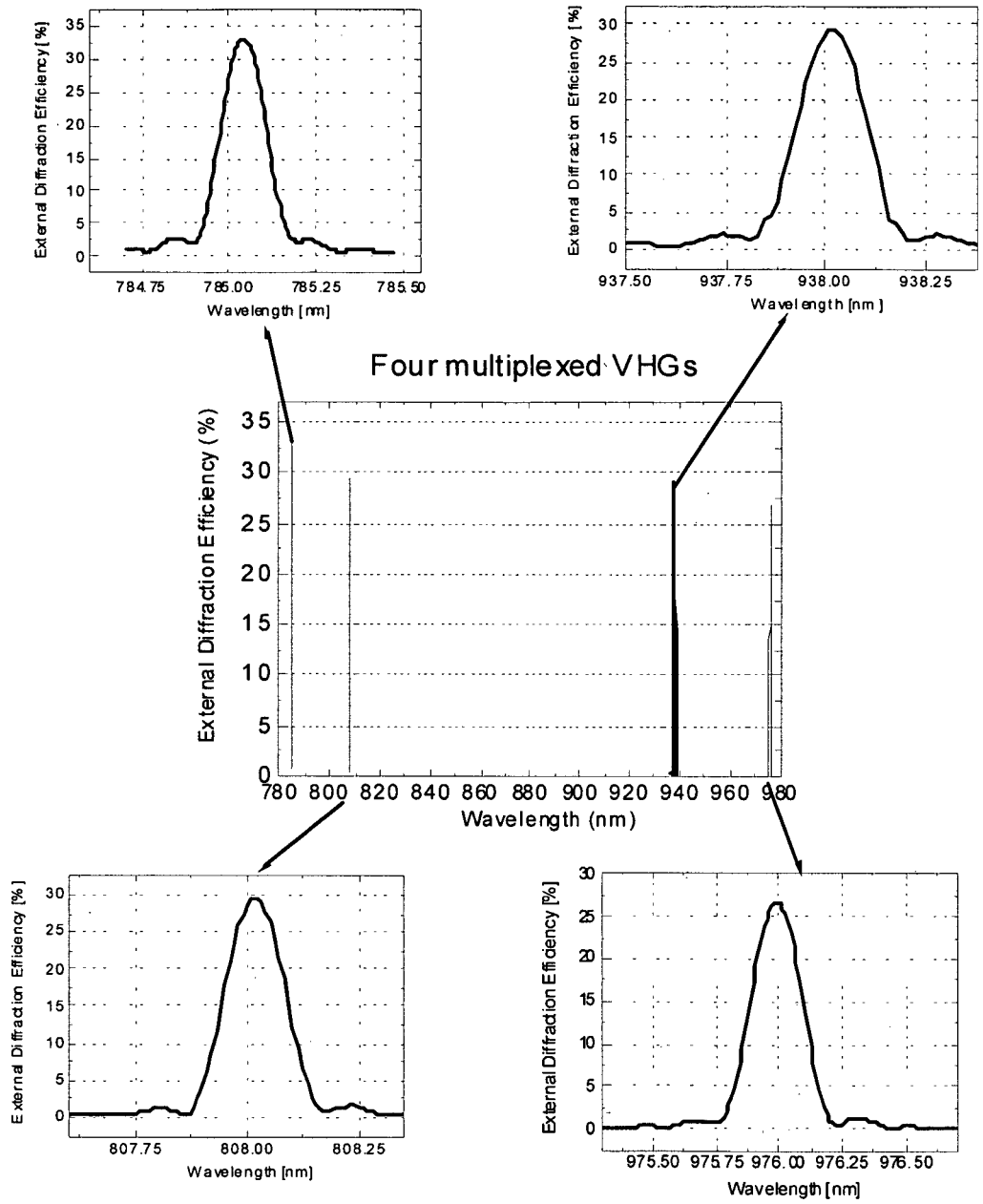
FIG. 5 describes examples of the spectral response of the narrow band volume holographic reflector.

The spectral response of several typical holographic reflection filters are shown in FIG. 5. The wavelengths of the VHG filters serve to capture the input laser and lock it to a desired wavelength as illustrated in FIG. 5.

The invention provides multiple functionality in a single volume holographic grating for the purpose of delivering and generating pumps and signal beam to and from a fiber.

Thus, systems, methods and apparatus are described in conjunction with one or more specific embodiments. The invention is defined by the claims and their full scope of equivalents.

What is claimed is:

1. A grating coupler comprising,
a volume holographic grating element extended throughout the bulk of the holographic element, having at least two volume gratings overlapping in its volume
a first optical beam in a first specific range of wavelength received and diffracted freely in three dimensions by said volume holographic grating element producing a first output beam
and a second beam propagating substantially co-linearly with first output beam and in opposite direction in a specific range of wavelength substantially different from said first wavelength range received and diffracted freely in three dimensions by said volume holographic grating element producing a second output beam propagating substantially co-linearly and in the same direction with said first output beam.

2. The coupler of claim 1 where the first beam is an optical pump beam.

3. The coupler of claim 2 where the pump beam is generating by laser diodes.

4. The coupler of claim 2 where the pump beam is generated by a solid state laser.

5. The coupler of claim 2 where the pump beam is generating by a gas laser.

6. The coupler of claim 2 where the pump beam wavelength comprises one of 785+/−5 nm, 795+/−5 nm, 808+/−5 nm, 865+/−5 nm, 880+/−5 nm, 905+/−5 nm, 915+/−5 nm, 935+/−5 nm, 969+/−5 nm, 976+/−5 nm, 985+/−5 nm, 1064+/−5 nm, 1530+/−5 nm.

7. The coupler of claim 6 where the optical beams are pump beams generated by gas lasers.

8. The coupler of claim 1 where the second beam is the signal beam generated by a fiber laser.

9. The coupler of claim 1 where the second beam is the signal beam generated by a solid state laser.

10. The coupler of claim 1 where the volume holographic grating coupler is a volume hologram in photorefractive glass.

11. The coupler of claim 1 where the volume holographic grating coupler is a volume hologram in photorefractive Lithium Niobate.

12. The coupler of claim 1 where the volume holographic grating coupler is a volume hologram in photorefractive polymer.

13. A grating coupler comprising,
a volume holographic grating element extended throughout the bulk of the holographic element, having more than two volume gratings overlapping in its volume
a plurality of optical beams in a first specific range of wavelength received and diffracted freely in three dimensions by said volume holographic grating element producing a plurality of first output beams propagating substantially in the same direction
and a second beam propagating substantially co-linearly with the plurality of said first output beams and in opposite direction in a specific range of wavelength substantially different from said first wavelength range received and diffracted freely in three dimensions by said volume holographic grating element producing a second output beam propagating substantially co-linearly and in the same direction with said plurality of first output beams.

14. The coupler of claim 13, where the optical beams are optical pump beams.

15. The coupler of claim 14 where the optical beams are pump beams generated by laser diodes.

16. The coupler of claim 14 where the optical beams are pump beams generated by solid state lasers.

17. The coupler of claim 14 where the pump beams wavelengths comprise one of 785+/−5 nm, 795+/−5 nm, 808+/−5 nm, 865+/−5 nm, 880+/−5 nm, 905+/−5 nm, 915+/−5 nm, 935+/−5 nm, 969+/−5 nm, 976+/−5 nm, 985+/−5 nm, 1064+/−5 nm, 1530+/−5 nm.

18. The coupler of claim 13 where the second beam is a signal beam generated by a fiber laser.

19. The coupler of claim 13 where the second beam is a signal beam generated by a solid state laser.

20. The coupler of claim 13 where the volume holographic grating coupler is a volume hologram in photorefractive glass.

21. The coupler of claim 13 where the volume holographic grating coupler is a hologram in photorefractive Lithium Niobate.

22. The coupler of claim 13 where the volume holographic grating coupler is a volume hologram in photorefractive polymer.

* * * * *